United States Patent [19]

Fleckner

[11] Patent Number: 4,676,654

[45] Date of Patent: Jun. 30, 1987

[54] AGITATOR DEVICE

[75] Inventor: Heinz J. Fleckner, Olpe, Fed. Rep. of Germany

[73] Assignee: Battenfeld Maschinenfabriken GmbH, Meinerzhagen, Fed. Rep. of Germany

[21] Appl. No.: 821,620

[22] Filed: Jan. 23, 1986

[30] Foreign Application Priority Data

Jan. 23, 1985 [DE] Fed. Rep. of Germany ....... 3502071

[51] Int. Cl.⁴ .............................................. B29D 27/02
[52] U.S. Cl. ........................................ 366/98; 261/87;
 261/93; 366/102; 366/104; 366/169; 366/295;
 366/308; 366/326
[58] Field of Search ....................... 366/69, 76, 97, 98,
 366/101, 102, 103, 104, 167–169, 285, 292, 293,
 294–296, 308, 325, 326; 261/87, 93

[56] References Cited

U.S. PATENT DOCUMENTS

| | | | |
|---|---|---|---|
| 2,684,233 | 7/1954 | Payne | 366/102 X |
| 2,992,182 | 7/1961 | Elzinga et al. | 366/102 X |
| 4,240,990 | 12/1980 | Inhofer et al. | 261/87 |
| 4,464,055 | 8/1984 | Mercatoris et al. | 366/168 X |
| 4,576,089 | 3/1986 | Chauvin | 366/326 X |
| 4,610,547 | 9/1986 | Bennett et al. | 366/293 X |

FOREIGN PATENT DOCUMENTS 0110244  6/1984  European Pat. Off. .
1457300  2/1973  Fed. Rep. of Germany .

OTHER PUBLICATIONS

Kunstsoffe 74 (1984) 11—pp. 659–660.

Primary Examiner—Timothy F. Simone
Attorney, Agent, or Firm—Toren, McGeady & Associates

[57] ABSTRACT

An agitator device for charging gas into PUR-components and for the homogenization of the PUR-components and the gas for the production of a foam material includes a pressure vessel for containing the mixture of components and gas with a stirring device extending into the body of the mixture. The stirring device includes a shaft which can be driven in opposite directions. First and second stirring elements are located on the shaft. In one direction of rotation only the first stirring elements operate to charge gas into the PUR-components and when the shaft is driven in the other direction both the first and second stirring elements operate to homogenize the mixture. In one arrangement, due to the direction of rotation, the second stirring elements can be pivotally displaced between a stirring position and an inactive position. In another arrangement the second stirring elements can be selectively connected to the shaft by a clutch so that the clutch engages the stirring elements for rotation in only one rotational direction of the shaft.

27 Claims, 5 Drawing Figures

AGITATOR DEVICE

BACKGROUND OF THE INVENTION

The present invention is directed to an agitator device for charging gas into fluid or flowable polyurethane components (PUR-components) for the production of a mixture of polyol (polyhydroxy alcohol) and isocyanate and for the homogenization of the mixture to form a foamed plastics material and the device includes a driven rotatable hollow stirrer located in a pressure vessel containing the PUR-component, such as polyol, with the stirrer including stirring elements which may be hollow and provided with gas exit openings located within the mixture and being in communication with a source of pressurized gas.

A process for the automatic charging of gas into PUR-components is known from the European patent document No. A 0 110 244 and from DEZ "Plastics", year 74 (1984), Brochure 11,pages 659 and 660 where the charging is effected by an agitator device of the species conforming type. In this process nitrogen or dried air is, as a rule, utilized as the gas.

It is possible in the known process that only extremely small gas particles are mixed into the PUR-component at the sharp edges of the device though a high gas transport and a rapid gas charging takes place. It has been found, however, with this known process and employing the known agitator device, that optimum homogenization of the fluid PUR-component cannot be assured.

SUMMARY OF THE INVENTION

Therefore, it is the primary object of the present invention to provide an improved agitator device of the type described above in a simple arrangement involving minor technical expenditures so that the agitator device can be used not only for gas charging but also for the homogenization of the mixture containing the fluid PUR-component.

In accordance with the present invention, the rotationally driven hollow stirrer is arranged so that it can be driven in two opposite directions. The stirrer includes an axially extending shaft with first and second stirring elements mounted on the shaft. When the shaft is rotated in one direction only the first stirring elements are effective for providing charging of gas into the contents of the pressure vessel. When the second stirring elements are also rotated, as the shaft is driven in the opposite direction, the mixture in the pressure vessel can be homogenized.

The first and second stirring elements can be positioned in the same plane with the second elements spaced radially outwardly from the circle of rotation of the first stirring elements. The second stirring elements can be hinged about pivot joints so that they can be displaced between a generally radially outwardly extending position and an inwardly folded position. Further, the outwardly displaced position can be adjusted. The displacement between the different positions can be effected by the direction in which the shaft is rotated. In other words, if the shaft is rotated in one direction the second stirring elements are located in the folded-in position and rotation in the opposite direction displaces the second stirring element into the generally radially outwardly extending position.

With such an arrangement there is the advantage that the same agitator device can be operated for charging gas or for homogenizing the mixture by simply reversing the direction of rotation of the shaft.

In a suitable arrangement of the stirring element, by controlling the gas outlet openings in the stirring elements, it would be possible to proceed with the gas charging step and the homogenizing step at the same time.

In one embodiment of the agitator device according to the present invention the rotational drive of a hollow shaft, that is, its speed or rpm can be varied when the direction of rotation is reversed whereby the rpm of the shaft with the stirring elements in the folded in position being greater than the speed of the stirring elements in the outwardly displaced position. It has been found to be particularly effective to adjust the rpm of the shaft when rotated in opposite directions in a ratio of approximately 15:1. During the homogenizing procedure using the agitator device, the shaft can be rotated in one direction at a speed of 100 rpm and the gas charging procedure can be carried out with the shaft operating in the opposite direction at a speed of 1500 rpm.

In one embodiment of the present invention the first and second stirring vanes can be arranged in the same plane. This can be effected with the first stirring elements having pivotal joints mounted on their radially outer ends for supporting the second stirring elements. In another arrangement, an annular member or ring can be secured to the radially outer ends of the first stirring elements with the ring arranged concentrically about the shaft and with the second stirring elements being pivotally mounted on the ring.

It would also be possible to locate the second stirring elements on a lower plane relative to the first stirring elements with the second stirring elements being connected directly to the drive shaft.

It is also possible to change the orientation of the second stirring element with regard to their position relative to the plane of the first stirring elements so that the angle through which the second stirring elements are displaced outwardly relative to the first stirring elements can be varied.

Under certain situations it is advantageous if the agitator device is arranged with the pressurized gas source either separable from or connectable to the stirring elements by a change in the direction of rotation and/or a change in the speed of the driven shaft. Such an arrangement can be afforded by a simple slide control valve associated with the shaft. In addition to an electric motor, a pneumatic or hydraulic motor could be used to drive the agitator device. An electric motor with pole reversal and a regulating gear unit could also be employed. In accordance with the present invention, a hollow stirrer can be used with a reversible rotational drive and with the second stirring elements located outside the plane of rotation of the first stirring elements with the shaft being connected to the second stirring elements by a disengagable coupling or clutch, such as a freewheeling clutch, with the clutch being automatically engaged or disengaged based on the direction of rotation of the shaft.

It has been found to be particularly advantageous if the drive motor for the agitator device is a three-phase electric motor connected to a frequency converter for regulating the rpm of the shaft.

Another feature of the invention involves the use of a density scale connected in a closed circulation system with the pressure container. Accordingly, the density scale is equipped with maximum and minimum contacts which control the rotational direction and the speed of the drive of the three-phase motor.

The pump in the closed circulation system has its own drive motor and is designed for a constant output.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
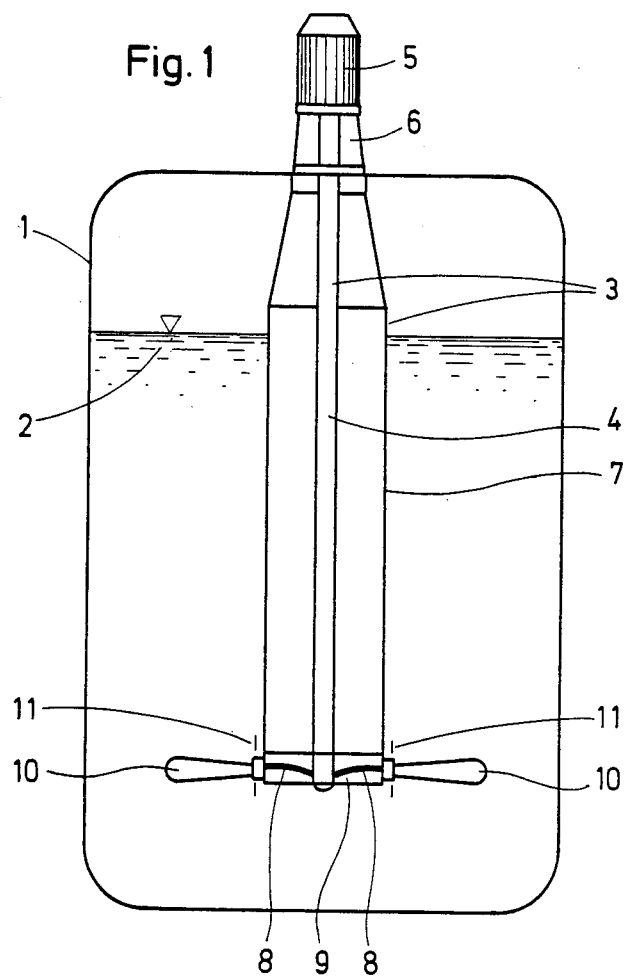
FIG. 1 is a schematic elevational view of an agitator device embodying the present invention positioned within a pressure vessel.

In FIG. 1 a fluid polyurethane or PUR-component 2 is shown in a pressure vessel 1 with the level of the component spaced downwardly from the top of the vessel so that a space is provided between the fluid level and the top of the vessel. The PUR-component 2 may be polyol and the surface of the component is in contact with a gas cushion introduced into the pressure vessel and the gas can be nitrogen or dried air.

An agitator device in the form of a so-called hollow stirrer 3 is located within the pressure vessel and extends downwardly into the fluid PUR-component 2. The stirrer 3 includes a vertically extending shaft 4 projecting upwardly out of the pressure vessel where it is connected to a drive motor 5 located above the pressure vessel. A control unit 6 is connected to the motor 5. The shaft is located within a tube 7 which laterally encloses the shaft. At the lower end of the shaft 4 and of the tube 7 first stirring elements 8 are connected to the shaft and extend generally radially outwardly to a ring 9 aligned with the tube 7. When the first stirring elements 8 are rotated in one of the rotatable directions of the shaft 4, the gas, such as nitrogen or dried air, is charged into the PUR-component. For effecting the charging of the gas into the component, the stirring elements 8 are provided with gas outlet openings connectible to a pressurized gas source, such as the gas cushion in contact with the surface of the component within the pressure vessel either through the tube 7 or the shaft 4.

The ring 9 is secured to the radially outer ends of the first stirring elements 8 and the ring is concentric to the shaft 4. Second stirring elements 10 are mounted on the ring 9 and can be pivoted about an axis 11 between the folded-in position shown in FIG. 2 where the elements 10 extend generally along the outside surface of the ring 9 and the position shown in FIG. 3 where the stirring elements 10 project generally radially outwardly from the ring 9.

Figure 2:
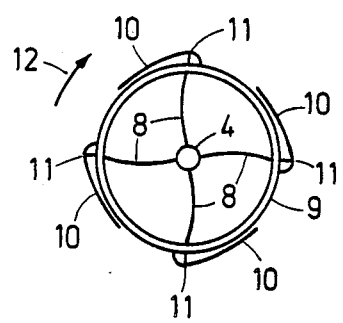
FIG. 2 is a schematic sectional view of the agitator device during the gas charging procedure.
Figure 3:
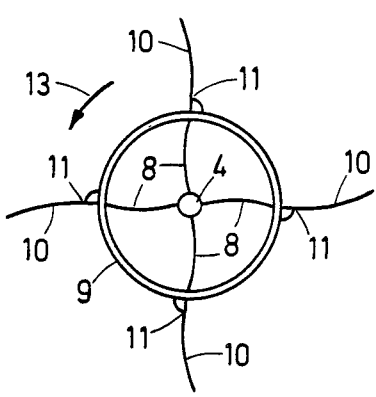
FIG. 3 is a schematic sectional view, similar to FIG. 2, however, illustrating the agitator device during the homogenizing procedure.

In FIGS. 2 and 3 the direction of rotation of the shaft 4 and of the first stirring elements 8 is indicated by the arrows. In FIG. 2, as illustrated, the shaft rotates in the clockwise direction of arrow 12 while in FIG. 3 the shaft rotates in the opposite direction in the counterclockwise direction of arrow 13. When the shaft 4 is rotated by the drive motor 5 in the direction of arrow 12 the second stirring elements 10 are maintained in the folded-in position. When the shaft 4 is rotated in the opposite direction as indicated by arrow 13, that is, in the counterclockwise direction as viewed in FIG. 3, the second stirring elements 10 pivot outwardly into the position displayed in FIG. 3.

By operating the agitator device as depicted in FIG. 2 with the shaft 4 rotated by the drive motor 5 in the clockwise direction of arrow 12 the stirring elements charge the gas into the PUR-component located within the pressure vessel. The shaft rotates continuously at a constant high rpm, for instance, 1500 rpm for rapidly rotating the first stirring elements 8.

In FIG. 3 the agitating device is rotated counterclockwise in the direction of arrow 13 with the first stirring elements rotating in the direction opposite to that in FIG. 2 and with the second stirring elements 10 being pivotally displaced outwardly from the ring 9 into the position shown in FIG. 3. With the first and second stirring elements 8, 10 in the position shown in FIG. 3 the mixture of the gas and the PUR-component 2 in the pressure vessel 1 is homogenized with the shaft 4 operating at a speed of 100 rpm.

In the embodiment shown in FIG. 1 the second stirring elements 10 are located in approximately the same plane as the first stirring elements 8. This arrangement is possible because each of the second stirring elements 10 is pivotally mounted on a joint 11 either directly at the radially outer free ends of the first stirring elements 8 or on the ring 9 supported on the radially outer ends of the first stirring elements 8.

In a variation of the embodiment disclosed in FIG. 1 it is possible to position the second stirring elements 10 and their pivotal joints 11 in another plane spaced from the plane of the first stirring element 8. Preferably, the second stirring elements 10 would be located in a lower plane with the second stirring elements connected directly to the shaft 4 or to the tube 7 by the joint 11.

The operating position of the second stirring elements 10 can be varied, if necessary, by changing the angle of attack or inclination relative to the plane of rotation of the first stirring elements. It would also be possible to change the stirring capability of the second stirring vanes by changing the angle to which they are displaced radially outwardly from the position shown in FIG. 2 relative to the joints 11.

It has been proven that an electromotor with pole reversal for changing the direction of rotation of the shaft can be used as the drive for the agitator device. The drive motor 5 can be coupled to the shaft 4 by a control gear unit 6 so that, when the direction of rotation of the electric motor is reversed, automatically there is a changeover in the speed of the shaft 4 between 100 rpm and 1500 rpm.

Further, it is possible to control the connection between the pressurized gas source and the first stirring elements 8 by the control gear unit 6 directly by the reversal in the direction of rotation and/or by the change of speed. During rotation in one direction with a high rpm of the shaft 4, the connection between the pressurized gas source and the first stirring elements 8 could be established, and during the rotation in the opposite direction at low rpm of the shaft the connection between the pressurized gas source and the first stirring elements could be blocked.

Instead of using an electric motor for the drive motor 5, along with the control gear unit 6, a pneumatic motor or a hydraulic motor could be employed as the drive for the agitator device whereby the rotation of the agitator device can be reversed and the shaft can be driven at different speeds in the two opposite directions.

Figure 4:
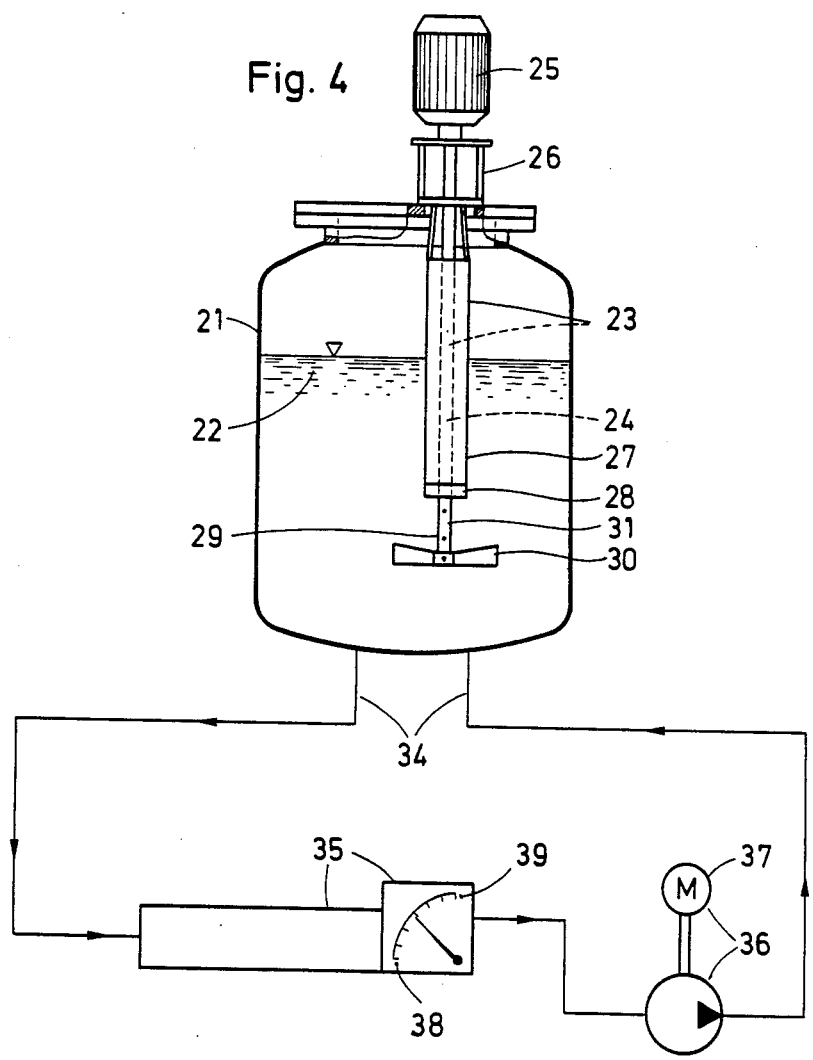
FIG. 4 is a schematic elevational showing of another agitator device embodying the present invention incorporated into a pressure vessel.

In FIG. 4 another embodiment of the present invention is displayed including a pressure vessel 21 containing a fluid PUR-component 22, such as polyol, with a gas cushion acting on the fluid level or surface of the component with the gas cushion being formed of nitrogen or dried air supplied into the pressure vessel.

In this embodiment a so-called hollow stirrer 23 projects downwardly through the top of the pressure vessel 21 into the body of the PUR-component 22 within the vessel. The shaft 24 for driving the stirring elements is rotated by a drive motor 25 located above the pressure vessel 21 with a control gear unit 26 regulating the direction and speed of rotation of the shaft.

As shown in FIG. 4, a tube 27 is disposed concentrically about the shaft 24 and is spaced radially outwardly from the shaft. The upper end of the tube 27 is spaced downwardly from the top of the pressure vessel 21 and upwardly from the level or surface of the fluid PUR-component 22 within the vessel. The lower end of the tube extends downwardly below the level of the component 22 and, immediately below the tube, first stirring elements 28 are positioned in the form of a suction wheel. The first stirring elements 28 draw the gas from the tube 27 and direct it into the PUR-component 22.

Below the first stirring elements 28 a lower shaft 29 extends axially downwardly from the upper shaft 24 and is connected to it by a freewheeling clutch 31. Second stirring elements 30 are secured on the lower end of the lower shaft 29.

The freewheeling clutch is arranged so that it automatically disengages in one direction of rotation of the upper shaft 24 and engages automatically in the opposite direction of rotation. With the clutch 31 disengaged, the shaft 24 is driven at a relatively high rate of speed, such as 950 rpm by a three-phase motor 25. In the opposite direction of rotation of the three-phase motor 25 the shaft is rotated at a speed of about 90 rpm.

Figure 5:
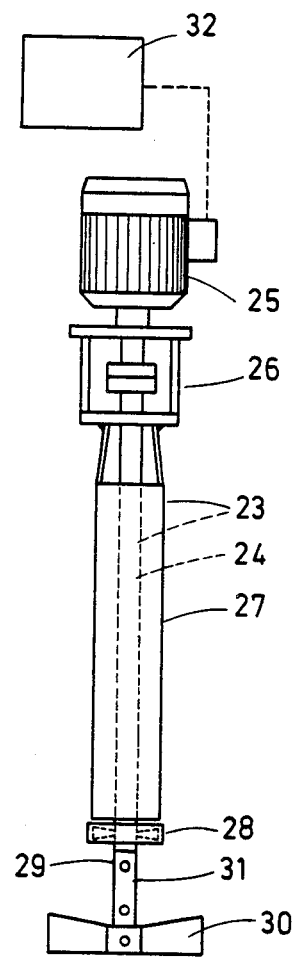
FIG. 5 is an enlarged elevational view of the agitator device in FIG. 4 and shown on a larger scale.

As shown in FIG. 5, the three-phase motor 25 is connected to a frequency changer or converter 32 for the purpose of regulating the speed of the motor.

The direction of rotation of the shaft 24 can be controlled by a density scale 35 located in a closed pumping circulation system 34 connected to the pressure vessel 21, note FIG. 4. The scale 35 is incorporated into the circulation system 35 on the suction side of a pump 36. The pump has its own drive motor 37 which provides a constant output performance. Density scale 35 has a minimum contact 38 and a maximum contact 39 and these contacts form a part of the control circuitry for the three-phase motor 25 and influence the direction of rotation and the speed of the motor.

The pump 36 continuously draws a constant amount of the component from the pressure vessel 21 causing it to pass through the density scale 35 and then conveying it from the pump back into the presure vessel 21.

Accordingly, the density scale is influenced depending upon the gas content of the component flowing through the circulation system 34. During operation, the minimum contact 38 remains closed as long as the predetermined gas content of the component has not been reached. Accordingly, the first stirring elements are rotated at a high speed in one direction of rotation of the shaft 24 so that the gas can be charged into and mixed with the component. As soon as the desired amount of gas within the component is reached, the maximum contact 39 is triggered. As a result the direction of rotation of the shaft 24 is reversed and at the same time the speed is considerably reduced. Due to the reversal of the rotational direction of the shaft 24, the freewheeling clutch 31 engages automatically and couples the lower shaft 29 for rotation with the upper shaft 24. With the direction of rotation of the shaft reversed and with the rotation being carried at a reduced speed, the second stirring vanes mounted on the shaft 29 are rotated and effect the mixing and the homogenization of the mixture of gas and component in the pressure vessel 21.

While specific embodiments of the invention have been shown and described in detail to illustrate the application of the inventive principles, it will be understood that the invention may be embodied otherwise without departing from such principles.

I claim:

1. Agitator device for charging gas into and for the homogenization of flowable PUR-components and the gas for the production of a foamed plastics material, comprising a pressure vessel arranged to contain the PUR-components in fluid form so that a fluid level is formed in said pressure vessel, a rotationally driven hollow stirrer located within said pressure vessel including first and second stirring elements located below the fluid level, means in combination with said stirrer for supplying a gas into the PUR-component below the fluid level, wherein the improvement comprises that said hollow stirrer comprises a reversible rotational drive, an axially extending shaft connected to said rotational drive for rotation of said shaft in the clockwise and counterclockwise directions about said shaft axis, said first stirring elements connected to said shaft for rotation in the clockwise and counterclockwise directions and having a circle of rotation, said second stirring elements extending radially outwardly from the circle of rotation of said first stirring elements, means for mounting said second stirring elements so that in one of the oppositely directed rotational movements of said shaft said second stirring elements do not provide any stirring action and in the other of the oppositely directed movements of said shaft said second stirring elements provide a stirring action.

2. Agitator device, as set forth in claim 1, wherein said first stirring elements are hollow.

3. Agitator device, as set forth in claim 1, wherein said first stirring elements are hollow and have gas outlet openings with said gas outlet openings being connected to a pressurized gas source for supplying the pressurized gas into the PUR-component.

4. Agitator device, as set forth in claim 1, wherein said first stirring elements have gas outlet openings in communication with a pressurized gas source for conveying the pressurized gas source from the first stirring elements into the PUR-component within the pressure vessel.

5. Agitator device, as set forth in claim 1, wherein said means for mounting said second stirring elements pivotally displaceably mounts said second stirring elements for movement between a first position where the second stirring elements are folded-in so that they extend generally in the direction of rotation of the shaft and a second position where said second stirring elements extend generally radially relative to said shaft.

6. Agitator device, as set forth in claim 5, wherein said second stirring elements are maintained in the first position when said shaft rotates in one direction and are displaced into the second position when said shaft rotates in the other direction.

7. Agitator device, as set forth in claim 6, wherein the rotational speed of said drive shaft can be varied when its rotational direction is reversed so that the second stirring elements are maintained in the first position when the shaft is rotated at a higher rpm and said second elements are displaced into the second position when said shaft is rotated in the opposite direction and at a lower rpm.

8. Agitator device, as set forth in claim 7, wherein the speed of the shaft in the first position of said second stirring elements is in a ratio of 15:1 to the speed of said shaft with said second stirring elements in the second position.

9. Agitator device, as set forth in claim 7, wherein said second stirring elements are located in approximately the same plane as said first stirring elements.

10. Agitator device, as set forth in claim 7, wherein said second stirring vanes are arranged in a different plane of rotation than the plane of rotation of said first stirring vanes.

11. Agitator device, as set forth in claim 10, wherein the plane of rotation of said second stirring vanes is spaced further from the fluid level of the PUR-component in said pressure vessel than the rotational plane of said first stirring elements.

12. Agitator device, as set forth in claim 7, wherein said second stirring elements are variably displaceable angularly with respect to said shaft relative to the angular position of said first stirring element relative to said shaft.

13. Agitator device, as set forth in claim 7, wherein the angular displacement of said second stirring elements outwardly from the first position is variable relative to the radial direction outwardly from said shaft.

14. Agitator device, as set forth in claim 1, including a pressurized gas source, means for selectively connecting said pressurized gas source to said first stirring elements, and said means being controllable based on at least one of the rotational direction of said shaft and the rotational speed of said shaft.

15. Agitator device, as set forth in claim 1, wherein a pneumatic motor drives said rotationally driven hollow stirrer.

16. Agitator device, as set forth in claim 1, wherein a hydraulic motor drives said rotationally driven hollow stirrer.

17. Agitator device, as set forth in claim 1, wherein an electric motor drives said rotationally driven hollow stirrer.

18. Agitator device, as set forth in claim 17, wherein said electric motor is capable of pole change and is connected to said shaft by a control gear unit.

19. Agitator device, as set forth in claim 7, wherein said hollow stirrer includes a tube concentrically disposed about and spaced outwardly from said shaft with said tube having one end located above the level of the PUR-component in said pressure vessel and the other end located below the level of the PUR-component within said pressure vessel.

20. Agitator device, as set forth in claim 1, wherein said stirrer includes a reversible rotational drive, said second stirring element spaced from the plane of rotation of said first stirring elements, a second shaft extending coaxially from said first shaft with said second stirring element mounted on said second shaft, and a disengageable clutch interconnecting said first and second shafts, said clutch is a freewheeling clutch which is automatically engaged in one rotational direction of said first shaft and is disengaged in the opposite rotational direction of said shaft so that in the engaged position said first and second shafts rotate together.

21. Agitator device, as set forth in claim 20, wherein said rotational drive is a three-phase electric motor, and a frequency changer in operative engagement with said three-phase motor for varying the rotational speed of said motor.

22. Agitator device, as set forth in claim 1, wherein a closed circulation system has an inlet and outlet connected to said pressure vessel, a pump located within said circulation system having a suction side and a pressure side, a density scale located in said circulation system between the suction side of said pump and the inlet into said circulation system, and said density scale connected to said rotationally driven hollow stirrer for selectively controlling the rotational direction of said shaft of said stirrer in dependence on the amount of pressurized gas mixed in with the PUR-component.

23. Agitator device, as set forth in claim 22, wherein said density scale has a maximum contact and a minimum contact for effecting the rotational direction and the speed control for said rotationally driven hollow stirrer.

24. Agitator device, as set forth in claim 23, wherein a three-phase motor provides the rotational drive for said shaft of said stirrer.

25. Agitator device, as set forth in claim 22, wherein a drive motor operates said pump in said circulation system and said drive motor provides a constant output performance for said pump.

26. Agitator device, as set forth in claim 20, wherein a tube is concentrically disposed about said shaft with the upper end of said tube located between the fluid level of the PUR-component in said pressure vessel and the lower end of said tube located above the lower end of said shaft, said first stirring elements located on said shaft between the lower end of said tube and the lower end of said shaft, and said second stirring elements spaced downwardly from said first stirring elements.

27. Agitator device, as set forth in claim 5, wherein a concentric ring is mounted on the radiallly outer end of said first stirring elements and said second stirring elements are pivotally mounted on said ring.

* * * * *